US010387691B2

(12) United States Patent
Frederick

(10) Patent No.: US 10,387,691 B2
(45) Date of Patent: Aug. 20, 2019

(54) POLAR TRANSMITTER FOR AN RFID READER

(71) Applicant: Clairvoyant Technology LLC, Durham, NC (US)

(72) Inventor: Thomas J. Frederick, Chapel Hill, NC (US)

(73) Assignee: Clairvoyant Technology LLC, Durham, NC (US)

( * ) Notice: Subject to any disclaimer, the term of this patent is extended or adjusted under 35 U.S.C. 154(b) by 260 days.

(21) Appl. No.: 15/115,769

(22) PCT Filed: Dec. 4, 2014

(86) PCT No.: PCT/US2014/068488
§ 371 (c)(1),
(2) Date: Aug. 1, 2016

(87) PCT Pub. No.: WO2015/119707
PCT Pub. Date: Aug. 13, 2015

(65) Prior Publication Data
US 2017/0012675 A1     Jan. 12, 2017

Related U.S. Application Data

(60) Provisional application No. 61/937,789, filed on Feb. 10, 2014.

(51) Int. Cl.
*G06K 7/10* (2006.01)
*H04B 5/00* (2006.01)
(Continued)

(52) U.S. Cl.
CPC ....... *G06K 7/10009* (2013.01); *H04B 5/0062* (2013.01); *H04L 25/4902* (2013.01); *H04L 27/04* (2013.01)

(58) Field of Classification Search
None
See application file for complete search history.

(56) References Cited

U.S. PATENT DOCUMENTS 5,301,367 A    4/1994  Heinonen
7,205,835 B1   4/2007  Lie et al.
(Continued)

FOREIGN PATENT DOCUMENTS

CN    101164310    4/2008
CN    102144378    8/2011

OTHER PUBLICATIONS

Clairvoyant Technology LLC, International Patent Application No. PCT/US14/68488, International Search Report and Written Opinion, dated Mar. 4, 2015.
(Continued)

*Primary Examiner* — Carlos Garcia
(74) *Attorney, Agent, or Firm* — Kilpatrick Townsend & Stockton LLP

(57) ABSTRACT

A polar transmitter for an RFID reader and a system using the polar transmitter are disclosed. An RFID system according to at least some embodiments of the invention includes a polar transmitter employing a switch mode power amplifier. The system can also include a receiver to receive responses from RFID tags and a coupler connected to the polar transmitter, the receiver and one or more antennas. In at least some embodiments, the polar transmitter of the RFID system includes an envelope amplifier connected to the switch mode power amplifier to provide an envelope signal and a phase modulator connected to the switch mode power amplifier to phase modulate the switch mode power amplifier using a phase signal. In at least some embodiments, the polar transmitter of the RFID system transmits (Continued)

OPR-ASK signals to reduce AM modulation depth and provide a continuous phase signal for the phase modulator.

25 Claims, 10 Drawing Sheets

(51) Int. Cl.
    *H04L 25/49*         (2006.01)
    *H04L 27/04*         (2006.01)

(56) References Cited

U.S. PATENT DOCUMENTS

| | | |
|---|---|---|
| 2005/0064830 A1 | 3/2005 | Grigore |
| 2007/0160164 A1 | 7/2007 | Sahota |
| 2008/0079579 A1 | 4/2008 | Posamentier |
| 2014/0206301 A1* | 7/2014 | Geddada .......... H03H 7/40 455/83 |
| 2015/0091655 A1* | 4/2015 | Rozenblit .......... H03F 3/19 330/297 |

OTHER PUBLICATIONS

EP14881963.4, "Extended European Search Report", dated Sep. 22, 2017, 6 pages.
CN201480075196.9, "Office Action", dated Sep. 4, 2018 (9 pages—Chinese Office Action; 5 pages—English Summary).

* cited by examiner

POLAR TRANSMITTER FOR AN RFID READER

CROSS-REFERENCE TO RELATED APPLICATION

This application claims the benefit of International Application No. PCT/US2014/068488, filed on Dec. 4, 2014, which is incorporated herein by reference in its entirety.

BACKGROUND ART

Radio frequency identification (RFID) is used in a wide variety of logistics, supply chain, manufacturing, and other applications. For some RFID protocols the reader may modulate commands onto a radio frequency (RF) carrier signal and the RFID tags respond to the modulated commands. The reader's modulation must include amplitude modulation because some RFID tag's commonly use envelope detection to decode the commands. The amplitude modulation requires that the reader's RF power amplifier (RFPA) be linear enough to pass regulatory and protocol conformance testing. However, there is typically a trade-off between RFPA linearity and RFPA power efficiency. To reduce cost and package size, the high performance RFID reader design must jointly optimize RFPA linearity and power efficiency. Many conventional RFID readers use class-AB RFPA designs for which linearity and power efficiency may be conflicting properties.

DISCLOSURE OF EMBODIMENTS OF THE INVENTION

Embodiments of the present invention provide apparatus and methods for an improved RFID reader design using a polar transmitter. The apparatus according to embodiments of the invention can significantly improve the power efficiency and reduce the cost of the RFID reader. Embodiments of the invention, for example, may achieve power efficiencies of 66% or better. This can yield significant reductions in dissipated power with corresponding reductions in package size and cost as well as improved device reliability, since high temperatures due to dissipating power is often a cause of electronics failure. For example, a reader requiring RF power amplifier (RFPA) output of two watts using in a conventional quasi-linear class AB design at 33% efficiency will dissipate four watts of power internally. However, when using the polar transmitter design disclosed herein with 66% efficiency the RFPA would only dissipate one watt of power internally. The polar transmitter architecture disclosed herein can also eliminate expensive components such as the RF mixer or modulator as used in a direct conversion transmitter.

An RFID system according to at least some embodiments of the invention includes a polar transmitter employing a switch mode power amplifier, most often class E, inverse class E, class F, or inverse class F. By a switch mode power amplifier, what is meant is a circuit designed to convert DC power or low frequency power as from an envelope amplifier into RF power by approximating an ideal switch operation, e.g., by switching on and off at the radio frequency. The on/off switching occurs at the desired radio frequency thereby converting low frequency power to RF power.

In at least some embodiments of the invention the RF source which controls the switch mode power amplifier is phase modulated using a phase modulator provided with a phase signal to generate a phase modulated output, $$u(t)=e \cdot \cos(\omega t+p(t)).$$

In at least some embodiments of the invention the switch mode power amplifier's power source is amplitude modulated using an envelope amplifier to produce an amplitude modulated output, $$u(t)=e(t) \cdot \cos(\omega t).$$

In at least some embodiments of the invention both amplitude and phase modulation are used to produce a modulated output $$u(t)=e(t) \cdot \cos(\omega t+p(t))=\mathrm{Re}\{e(t) \cdot \exp(jp(t))\},$$

thus the name "polar transmitter", since the output signal is generated from a polar representation of the signal.

To achieve good spectral occupancy performance of the transmitter, the modulation employed in some embodiments may use OPR-ASK (offset phase reversal amplitude shift keying), which is PR-ASK with orthogonal offset carrier injection as disclosed in the PCT Patent Application entitled, "RF System Using PR-ASK with Orthogonal Offset," filed in the U.S. Receiving Office on even date herewith, claiming priority from U.S. Provisional Patent Application 61/926,568 filed on Jan. 13, 2014, both of which are incorporated herein by reference. The OPR-ASK modulation technique enables the spectrally efficient implementation of the polar modulation transmitter described herein. In at least some embodiments, the system also includes a receiver to receive responses from RFID tags and a coupler connected to the polar transmitter and the receiver to serve as the means to pass the transmitter output signal to one or more antennas and to pass the responses to the receiver.

In at least some embodiments, the polar transmitter of the RFID system includes an envelope amplifier connected to the switch mode power amplifier to provide an envelope signal and a phase modulator connected to the switch mode power amplifier to phase modulate the switch mode power amplifier using a phase signal. The envelope amplifier input signal and the phase signal can be sampled data signals produced by means of a processor such as a digital signal processor. In some embodiments the envelope amplifier can include or be powered by a switch mode power supply. In some embodiments, the power supply and hence the envelope amplifier can include a buck converter, though other types of switch mode topologies can alternatively be used.

The polar transmitter according to embodiments of the invention operates in part by phase modulating the switch mode power amplifier using the phase signal to produce the transmitter output signal based on the signal from the envelope amplifier. In some embodiments, the phase control is exercised by shifting the phase of the signal, for example, using a phase shifter connected to a local oscillator. In some embodiments a direct digital synthesizer is used to implement digital phase modulation. The envelope amplifier input signal can be or can include a pulse width modulated (PWM) signal. In some embodiments a linear regulator can be used in the envelope amplifier along with the switch mode power supply. The linear regulator and the switch mode power supply can be connected either in series or in parallel.

BEST MODES FOR CARRYING OUT THE INVENTION

Figure 1:
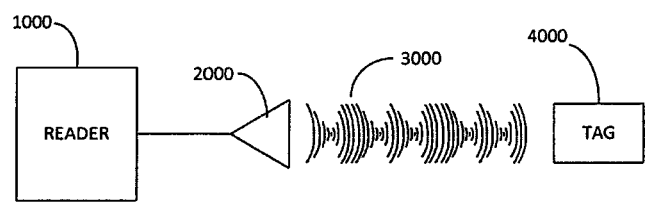
FIG. 1 is a functional block diagram of an example operating environment for an RFID system with an amplitude modulated reader-to-tag communications link.

Embodiments of the present invention now will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

Terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above", "below", "less", "more", are intended to encompass the concept of equality, thus, "less" can mean not only "less" in the strictest mathematical sense, but also, "less than or equal to."

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. It will also be understood that when an element is referred to as being "connected" or "coupled" to another element, it can be directly connected or coupled to the other element or intervening elements may be present.

This disclosure has to do with generating signals for RFID transmission. The conventional approach to generating modulated transmission signals is to use digital signal processing (DSP) techniques which produce a "digital signal", which is a quantized and sampled signal. These digital signals may be denoted such as x(n), where the argument is a variable such as n, m, or k. These variables represent the sample index, typically under a uniform sampling period $T_S$. The digital signal is passed from the DSP to a digital-to-analog converter (DAC) which produces a continuous time version of the signal, commonly using a zero-order-hold representation at the DAC output. For band limited signal reproduction the DAC output is followed by a low pass or band pass reconstruction filter which produces a continuous time, continuous amplitude version x(t) of the digital signal x(n), where we have replaced the sampled time argument "n" with the continuous time argument "t". The signal name "x" remains the same to indicate the sampled time and continuous time signals represent the same signal, even though there will generally be scaling differences and small time delays in the two signal representations. This Nyquist sampling theory and practice of sampled data systems is well known to those skilled in the art.

A block diagram of the operating environment of an example RFID reader 1000 using amplitude modulated reader-to-tag link communications 3000 is shown in FIG. 1. The reader 1000 is connected to one or more antennas 2000, which radiate the modulated transmit signal 3000 to one or more tags 4000. Some types of RFID tags decode commands from the reader which are encoded in the amplitude modulation of the reader's RF carrier signal. The modulated reader-to-tag signal 3000 may also contain phase modulation, but many types of tags only use the envelope for decoding. In some cases the envelope modulation depth of the reader's RF carrier is specified to be from 80% to 100%. Examples of this are the ISO 18000-63 protocol and EPC-Global C1G2 protocol, also informally known as "Gen2". The reader modulation typically uses either Manchester line codes or Pulse Interval Encoding (PIE) line codes. These two line codes are both present in the ISO 18000-6 standards for RFID in the ultra-high frequency (UHF) band. Note that although the example embodiments described herein are focused on UHF band RFID, the methods and apparatus described in the following can readily be applied to the 2.45 GHz microwave band, or other RFID readers and protocols in the UHF or microwave bands.

In backscatter RFID systems the data communications is typically half duplex. When finished modulating a command the reader 1000 will typically leave its RF carrier signal active so that one or more tags 4000 may backscatter modulate their response to the reader. If the tags 4000 are passive then they use the RF signal from the reader 1000 for power, while semi-passive tags have batteries to operate their circuitry instead of harvesting power from the reader RF transmission. All the tags 4000, whether passive or semi-passive, use the RF carrier signal from the reader 1000 as the medium to communicate back to the reader via backscatter modulation. The tags modulate their radar cross section to vary the amount of the reader's RF carrier which is reflected to the reader.

Figure 2:
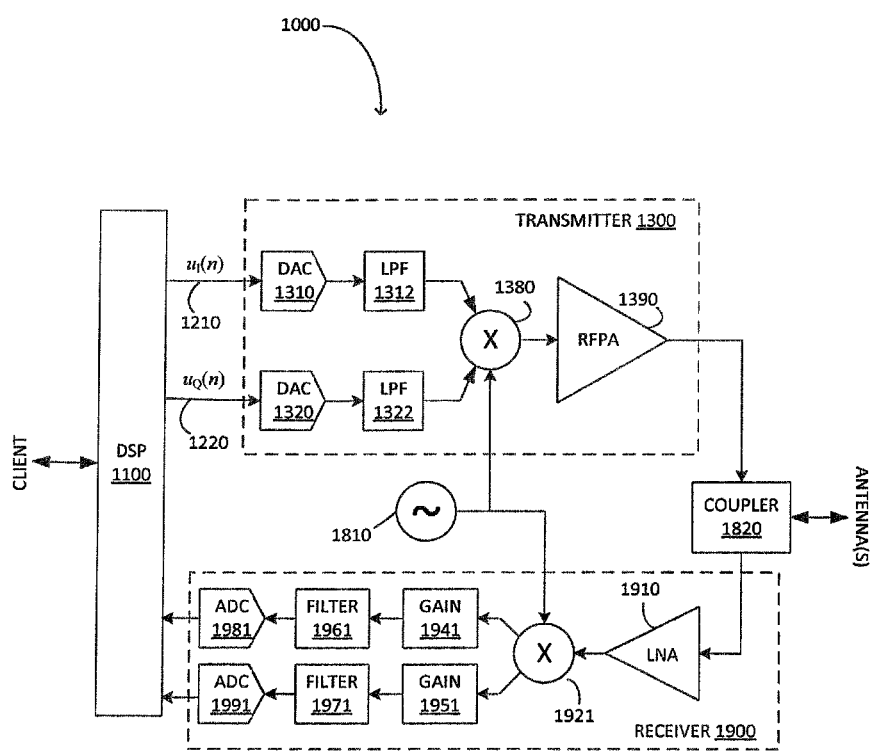
FIG. 2 is a block diagram of an RFID reader using a direct conversion transmitter and high RF gain receiver.

FIG. 2 illustrates an architecture for RFID reader 1000. The transmitter 1300 uses direct conversion to generate the amplitude modulated RF signal. In this design the in-phase 1210 and quadrature-phase 1220 baseband signals, $u_I(n)$ and $u_Q(n)$, respectively, are produced digitally in software and/or hardware using the digital signal processor (DSP) 1100. The baseband signals 1210 and 1220 are inputs to the digital-to-analog converters (DACs) 1310 and 1320 respectively, which produce baseband analog output signals. The baseband in-phase and quadrature-phase signals are passed through lowpass filters (LPF) 1312 and 1322, respectively, which perform anti-image filtering. These are also sometimes referred to as analog reconstruction filters by those skilled in the art. Filters 1312 and 1322 may also include gain, impedance conversion, and other signal conditioning functions. The filtered baseband signals are inputs to quadrature modulator 1380, which also gets local oscillator input from the RF synthesizer 1810, which provides the RF carrier signal to both the transmitter and receiver 1900. The output signal from quadrature modulator 1380 passes into the RF power amplifier (RFPA) 1390 which produces a high power version to be sent to one or more antennas 2000. Note that RFPA 1390 may consist of one or more preamplifier and driver stages as well as the final output device(s). In conventional amplitude modulated RFID transmitters the RFPA operates in a linear or quasi-linear mode such as class-AB. Practical efficiency for these types of amplifiers are in the 20% to 40% range in backscatter RFID applications given the peak-to-average ratio of the signals and linearity requirements involved.

Continuing with FIG. 2, the high power output of the RFPA 1390 is applied to the TX-RX coupler 1820. The principal function of the coupler 1820 is to send substantially most or all of the high power RFPA output signal to the antennas, while any signal coming into the reader from the antennas is mostly or all passed into the receiver 1900. The coupler 1820 minimizes the transmitter reflections and leakage passed into the receiver 1900. In conventional passive RFID reader design the coupler 1820 is typically an active coupler system with multiple control signals from the DSP used to adaptively null or cancel transmitter reflections and leakage into the receiver. An example of such a TX-RX coupler system is in U.S. Pat. No. 7,327,802 B2, which employs a magnetic or ferrite circulator to minimize losses in the receiver path together with a 3 dB combiner and various other signal tuning elements. Other embodiments of coupler 1820 may include vector modulators, PIN diodes, varactor diodes, or other active elements to adapt, control, tune, and cancel the transmitter leakage into the receiver. As will be described more fully with respect to FIG. 8 and FIG. 9, a useful embodiment for coupler 1820 is a four port passive coupler similar to that described in Kim et al in "A Passive Circulator for RFID Application with High Isolation using a Directional Coupler", in *Proceedings of the 36th European Microwave Conference,* 2006. In practice, a reflective modulator must be attached to the fourth port of the directional coupler to adaptively cancel the transmitter leakage into the receiver. Thus, coupler 1820 may be any of a number of adaptive systems which are commonly known to those skilled in the art to reduce transmitter leakage into the receiver.

The receiver 1900 uses a low noise amplifier (LNA) 1910 to add gain in the RF analog stage prior to the down conversion mixer 1921, providing the means to receive RFID tag responses. This is done is to improve the noise figure of the receiver 1900. This will be discussed in greater detail with regard to FIG. 8 and FIG. 9. Continuing with FIG. 2, the receive mixer 1921 performs a quadrature demodulation of the RF receive signal to baseband using the local oscillator signal provided by RF frequency synthesizer 1810. The baseband receive in-phase and quadrature phase signals are amplified by gain stages 1941 and 1951, respectively, and filtered by analog receive filters 1961 and 1971, respectively. In some implementations there may be more than one gain stage and the filtering may be distributed between the gain stages. In some implementations the gain and filtering can be combined by using active filters. The output of the baseband filtering and gain are input to the in-phase and quadrature-phase analog-to-digital (ADC) converters 1981 and 1991, respectively. The ADCs convert the analog signals to digital signals for further processing and decoding within the DSP 1100. The DSP 1100 interfaces with a client device to report tag responses.

Figure 3:
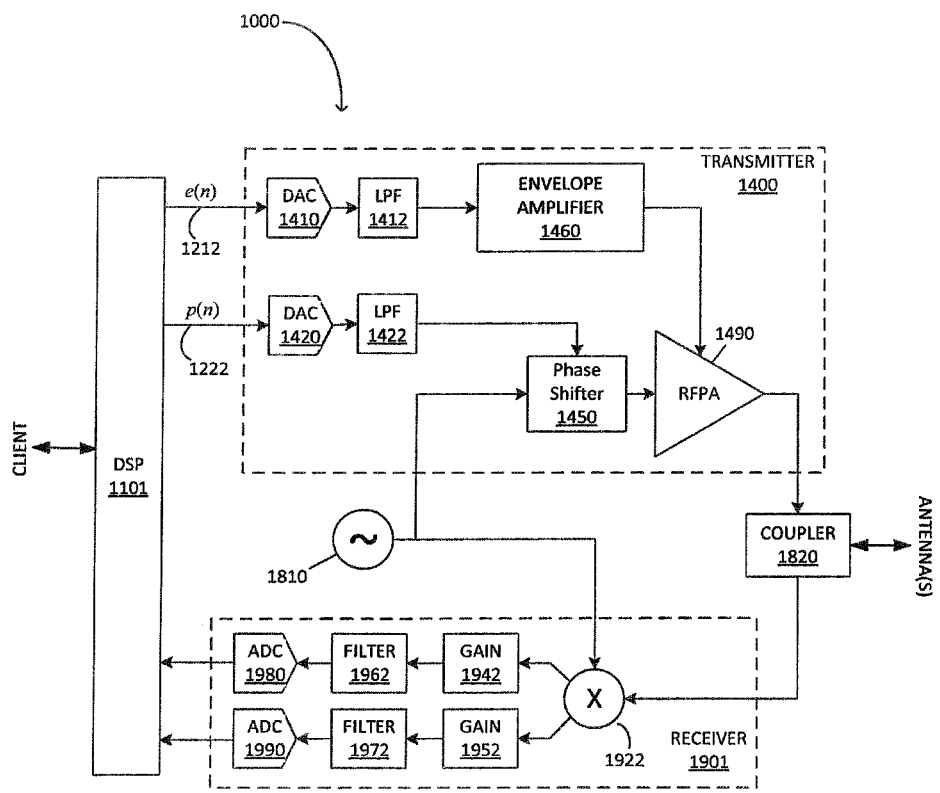
FIG. 3 is a block diagram of an RFID reader using a polar modulation transmitter and a low RF gain receiver for reduced cost.

FIG. 3 illustrates an architecture for RFID reader 1000 based on a polar modulation transmitter 1400 and a low cost receiver 1901 with an active mixer 1922. In this design the DSP 1101 produces sampled data signals e(n) 1212 which represents the envelope of the RF signal and p(n) 1222 which represents the phase of the RF signal. Note that the envelope and phase signals 1212 and 1222, respectively, may represent predistorted versions of the actual envelope and phase to compensate for linear and nonlinear distortion in the analog circuitry. The envelope 1212 and phase 1222 signals are inputs to the transmitter DACs 1410 and 1420, respectively, which are followed by lowpass filters 1412 and 1422, respectively. The output of the LPF 1412 in the envelope amplifier input signal path is input to an envelope amplifier 1460. The envelope amplifier is a fast tracking power converter or may accurately be referred to as a modulated power supply. The envelope amplifier 1460 provides a means to amplify the envelope amplifier input signal and includes and/or is supplied by one or more fixed power supplies, which is not shown in the block diagram of FIG. 3, and produces a high output power variable voltage which accurately tracks the input signal from the envelope DAC 1410 and lowpass filter 1412. The high power envelope output of envelope amplifier 1460 is used as the power supply for a switch mode RFPA 1490. The RFPA 1490 can be any type of saturated, switch mode RFPA such as class D, E, inverse E, F, inverse F, or similar, and provides a means to supply the transmit signal to the coupler and ultimately to the antenna. It may be referred to herein simply as a "switch mode power amplifier." Class E amplifiers are good design choices for UHF and the lower microwave band, with theoretical efficiency over 90%, although practical efficiencies are in the 60% to 80% range due to switching and passive component losses, among other factors.

By a switch mode power amplifier, what is meant is a circuit designed to convert DC power or low frequency power as from an envelope amplifier into RF power by approximating an ideal switch operation, e.g., by switching on and off at the radio frequency. The on/off switching occurs at the desired radio frequency thereby converting low frequency power to RF power. An ideal switch has either zero volts across it while current is flowing, or no current through it while it is off with voltage across it. Therefore, an ideal switch dissipates no power internally because there is never current flowing through it while there is voltage across it. Power devices such as RF MOSFET or RF BJT transistors can approximate switches by operating in or near device saturation and/or device cutoff. Sometimes this document refers to this as a saturated RFPA. This operation is distinctly different from the quasi-linear RFPA operation used in conventional RFID transmitter design, most often class AB.

The total efficiency of the transmitter 1400 may be characterized by the product of the individual efficiencies for the envelope amplifier 1460 and the RFPA 1490. For example, if the envelope amplifier converts the fixed power supply voltage(s) to a high power envelope signal with 80% efficiency, and the RFPA converts the time varying envelope amplifier output to RF energy with 80% efficiency, then the overall power efficiency of the transmitter may be said to be 64% efficient. Given the combined effect of both components on overall power efficiency, the design of both components 1460 and 1490 can be important. As discussed in the previous paragraph, a class-E amplifier may be a good choice for 1490. Regarding the envelope amplifier, while it could use a linear regulator type supply to track the input reference from LPF 1412, this would be very inefficient. The envelope amplifier should use some form of switched mode power conversion to achieve efficiency acceptable for a reduced cost RFID reader.

There are challenges in the design of a switch mode envelope amplifier. The main challenge is that the switching process produces noise which must be removed from the high power envelope output. The envelope amplifier switching frequency should be at least several times higher than the envelope bandwidth so that the switching noise can be filtered out. Higher switching frequencies mean the image and harmonic noise due to the switching process are at higher frequencies and will require a less complex output filter to adequately remove them. The efficiency of the switch mode power supply depends on the switching frequency of the converter with power efficiency of switching power supplies typically decreases as the switching frequency increases due to switching losses. These facts lead to us to an engineering design tradeoff in the switching frequency parameter between efficiency and output filter complexity/output noise level. For low bandwidth signals such as those used in backscatter RFID systems a buck converter may be a good choice for envelope amplifier 1460 due to straightforward circuitry and good efficiency. Other topologies are possible for 1460, such as boost/buck, multilevel converters, multi-input converters, multi-phase converters, or hybrids of these including linear regulator assistance.

A switch mode power supply should be a central component of the envelope amplifier since linear power supplies on their own have poor power efficiency. Some embodiments of the envelope amplifier may combine a linear regulator in series or parallel with the switch mode supply. This will be discussed in more detail with respect to FIG. 6 and FIG. 7. Some embodiments of the envelope amplifier will include explicit switching control from the DSP, as in FIGS. 5, 6, and 7. The embodiment of FIG. 3 has only an analog envelope reference signal as input from LPF 1412. In this case the switch mode control will use hysteretic feedback control, V2 control, or some other form of switching power supply controller used to track the reference analog input.

Continuing with the transmitter 1400 of FIG. 3, the phase signal 1222 passes through DAC 1420 and lowpass filter 1422 to be used as a control signal for phase shifter 1450. Phase shifter 1450 takes its input from the RF frequency synthesizer 1810 and serves as a phase modulator, providing a means to phase modulate the RFPA by shifting the phase of the signal provided. The phase shifter 1450 passes the local oscillator signal to the input of the RFPA 1490 after imparting a variable phase shift on it, the phase shift value being a function of the control signal received from the phase signal 1222. Design of such variable phase shifters based on RF diode networks is known to those skilled in the art. The input to the switch mode RFPA 1490 is typically considered a "constant envelope" signal, although some phase-to-amplitude modulation may occur within the phase shifter 1450 due to phase dependent insertion loss of the phase shift circuitry. Given that the RFPA 1490 is a switch mode amplifier, small variations in the RFPA input amplitude are not important since the driver circuitry for the RFPA 1490 are typically nonlinear and are essentially just turning the main RFPA power device on and off. The high power output of the RFPA 1490 is filtered to remove harmonics, which is a common operation with RFPAs and not shown in FIG. 3 for clarity. The output of transmitter 1400 is passed to the coupler 1820 which operates similar to that of FIG. 2.

Continuing with FIG. 3, the receiver output of the coupler 1820 is passed into receiver 1901 where it is passively connected to the active mixer 1922. By passively connected it is meant that the signal is passed by means that include no active, or powered, circuit stages between the output of the coupler 1820 and the input to the active mixer 1922. The active mixer 1922 uses a local oscillator signal from RF frequency synthesizer 1810 as input for the down conversion. By an active mixer it is meant a mixer which has a conversion gain instead of a conversion loss. The net gain of an active mixer 1922 would typically be around 3 dB, depending on the baseband output impedance of the mixer and correct design of the matching circuitry at the output of the mixer 1922. The reader design as shown in FIG. 3 is optimized for passive backscatter RFID. By using an active mixer 1922 which is passively connected to the coupler 1820, the noise figure of the RFID receiver is sufficient for passive backscatter RFID according to the ISO 18000-6 and Gen2 protocols, while maintaining very high linearity, low cost, and low power consumption. Conventional passive RFID reader design for ISO 18000-63 and Gen2 protocols use at least one LNA as in receiver 1900. Some reader designs even use more than one LNA in the receiver. However, FIG. 8 and FIG. 9 of this specification will disclose why this is an inferior architecture to the low RF gain architecture 1901 illustrated in FIG. 3. Receiver 1901 is optimized for performance and cost in RFID systems using Gen2 and/or passive ISO 18000-63.

Continuing with FIG. 3, the in-phase and quadrature-phase baseband outputs of the active mixer 1922 are passed to gain stages 1942 and 1952, respectively, then to baseband filters 1962 and 1972, respectively, and finally into the analog-to-digital converters (ADCs) 1980 and 1990, respectively. The outputs of the ADCs 1980 and 1990 are passed into the DSP 1101 for decoding tag responses, which are then passed from the DSP 1101 to the client device. Note that the baseband lineup shown in FIG. 3 is just one example embodiment. The filtering may be interspersed with the gain, or the filtering may be combined with the gain by using active filters. The gain stages 1942 and 1952 will commonly occur near the output of the active mixer 1922 so that the noise figure can be maintained. However, some designs may use an AC coupled receiver topology for which a DC blocking highpass filter section may be employed between the active mixer 1922 and the first gain stage 1942 and 1952. Blocking the DC signal content before the gain is often advantageous since the residual carrier leakage in the homodyne systems shown in the example embodiments of this disclosure can be very high and can cause compression and linearity problems if it is allowed to pass through the gain stages. The gain stages 1942 and 1952 may employ transformers or autotransformers as components to simultaneously supply voltage gain, impedance matching, and highpass filtering.

Polar transmitters such as in FIG. 3 may operate by separating the envelope and the phase of the baseband transmit signal using a transformation similar to $$e(n) = \sqrt{u_I(n)^2 + u_Q(n)^2},$$

and $$p(n) = \text{atan}(u_Q(n), u_I(n)),$$

for the envelope and phase, where $u_I(n)$ and $u_Q(n)$ are the Cartesian in-phase 1210 and quadrature-phase 1220 baseband signals of FIG. 2, which together form the complex baseband signal $$u(n) = u_I(n) + j u_Q(n),$$

where $j=\sqrt{-1}$. This nonlinear transformation from Cartesian to polar coordinates may be performed numerically inside DSP 1101 prior to sending the envelope amplifier input signal to the DACs 1410 and 1420. Alternatively, the envelope and phase signals may be generated using table driven signal synthesis as disclosed in patent application U.S. 61/926,568 filed on Jan. 13, 2014, incorporated herein by reference. The polar transmitter works on the polar signal representation $$u(n)=e(n)\cdot\exp(jp(n))$$

essentially by power amplifying the envelope amplifier input signal and applying the high power envelope signal to a constant envelope RF signal source which has had the phase signal p(n) modulated onto it. The high power output of the polar transmitter 1400 is $$u_{out}(t)=e_{out}(t)\cdot\exp(j(\omega t+p(t))),$$

which is a continuous time RF passband version of the original baseband signal u(n). Other approximations and implementations of the nonlinear transformation to get the envelope and phase are possible and do not depart from the ideas disclosed herein. Indeed, it is possible to directly create the waveform in the polar coordinate system without the transformation above, yet this is still within the scope of the RFID polar transmitter concepts disclosed herein.

Figure 4:
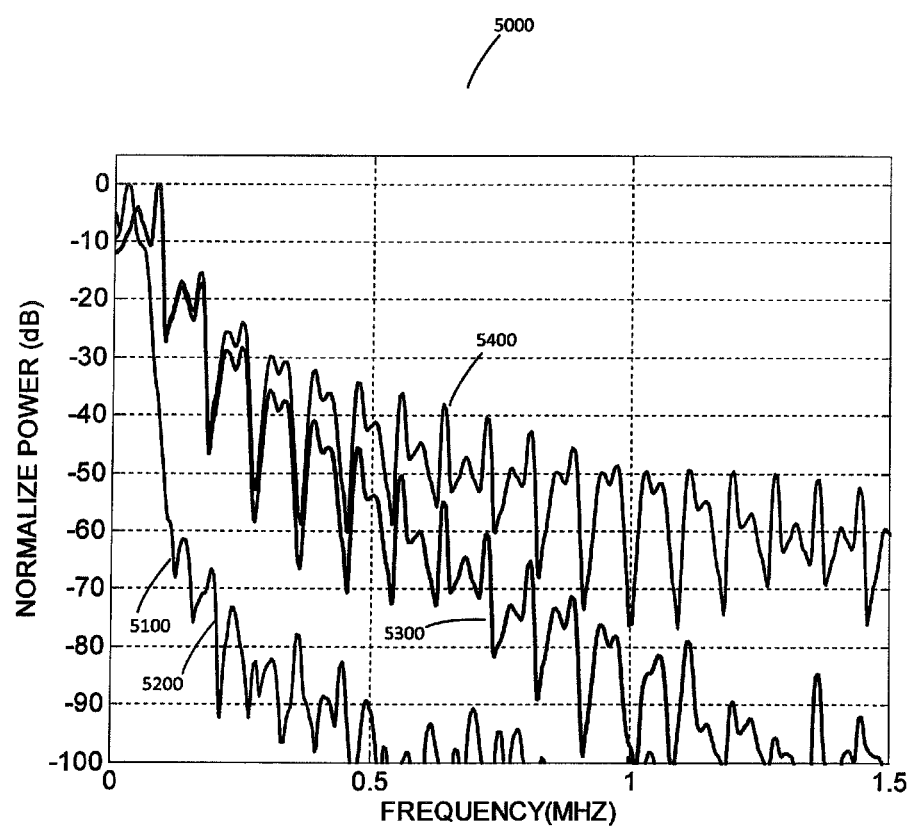
FIG. 4 is a frequency domain plot showing the power spectrum for PR-ASK, OPR-ASK, and the AC components of the envelopes for those signals.

While there are significant benefits to the polar transmitter architecture for RFID readers which are enumerated throughout this disclosure, there are also a number of challenges, including:
- Bandwidth expansion in the envelope e (n) and phase p (n) signals resulting from the implicit nonlinear transformations used to get these signals
- Time alignment between the envelope and phase paths in the polar transmitter must be carefully matched
- Deep amplitude modulation, such as amplitude modulation at or near 100%, is typically not feasible because the switch mode RFPA 1490 requires some minimum operating voltage with which to function properly The bandwidth expansion is an important but subtle concept which will be described further now with reference to FIG. 4. The bandwidth of the baseband signal u(n) and the transmitter output signal $u_{out}(t)$ are ideally the same, with the output signal simply translated up to RF frequency $f=\omega/2\pi$. In practice the power spectrum of $u_{out}(t)$ will have some additional "spectral regrowth" artifacts due to nonlinear distortion in the transmitter. The two component signals of the polar representation e(n) and p(n) individually will often have wider bandwidths due to the implicit or explicit nonlinear transformation used to generate these components, even though when recombined using $u(n)=e(n)\cdot\exp(jp(n))$ they result in the original signal bandwidth. The bandwidth expansion of the envelope amplifier input signal e(n) is particularly problematic because of tradeoffs between bandwidth and power efficiency in the envelope amplifier 1460.

For passive and semi-passive backscatter RFID systems the most common reader transmit data encoding and modulation formats in commercial use are
- Manchester encoded AM,
- PIE encoded large carrier AM (referred to as DSB-ASK), and
- PIE encoded suppressed carrier AM (referred to as PR-ASK).

Of these formats the Manchester and DSB-ASK may have no envelope bandwidth expansion since it may be possible, depending on the modulation depth, to express the envelope as $e(n)=u_r(n)$ for these transmit signals. However, Manchester and DSB-ASK are significantly less bandwidth efficient than PR-ASK. Bandwidth efficiency is typically defined in terms of bits per second per hertz, in other words, the data rate achieved per unit bandwidth. Thus, even though Manchester or DSB-ASK modes have little or no bandwidth expansion in their envelope amplifier input signal, the PR-ASK signal format is often preferred since the actual transmission signal achieves a higher bandwidth efficiency even though its envelope amplifier input signal has significant bandwidth expansion.

In addition to the envelope bandwidth expansion, there are other significant obstacles to implementing a polar transmitter using the PR-ASK mode, specifically:
- The fully modulated, theoretical 100% amplitude modulation depth is not practical to implement due to minimum operating voltage requirements of the switch mode RFPA output device
  - This applies to Manchester and DSB-ASK as well if they are fully modulated, i.e., at or near 100% amplitude modulation depth
- The polarity inversions in PR-ASK lead to discontinuities in the phase signal p(n) 1222 which are not possible to reproduce at the input to the phase shifter 1450 or within the phase shifter circuitry
- The time alignment between the phase and envelope signals as they effect the RF output signal require such high precision due to the abrupt, near 180 degree phase inversions in conventional PR-ASK A modulation format referred to as OPR-ASK is introduced in the previously mentioned PCT Patent Application entitled, "RF System Using PR-ASK with Orthogonal Offset." The OPR-ASK reader transmission format achieves a slightly better bandwidth efficiency than PR-ASK but is readily implemented using a polar transmitter since it does not suffer the obstacles pointed out above.

FIG. 4 contains plot 5000 of the power spectrum for several examples signals. The power spectra shown are for continuously modulated signals with random data. The power spectra for OPR-ASK 5100 and PR-ASK 5200 are shown to lie almost on top of one another. The only exception is near 0 hertz (DC) where the OPR-ASK spectra 5100 rises up several dB above the PR-ASK spectrum 5200. This is because the orthogonal offset in the OPR-ASK modulation technology creates a small DC component. The power spectrum 5300 is for the envelope amplifier input signal e (n) 1212 when the RFID reader transmit signal modulation is OPR-ASK, while the power spectrum 5400 is for PR-ASK modulation. These power spectra are shown with the average DC power supply component removed for clarity, so only the spectrum of the time varying envelope component is shown. The PR-ASK signal has frequent zero crossings in the baseband signal which causes significant bandwidth expansion in the envelope amplifier input signal e(n) 1212. The bandwidth of the envelope amplifier input signal is an important factor since this may affect the switching frequency and efficiency of the envelop amplifier.

An example embodiment of the RFID polar transmitter specified herein employed OPR-ASK modulation because of the following very important qualities:
- Reduced bandwidth expansion of the OPR-ASK envelope amplifier input signal
- Reduced amplitude modulation depth of OPR-ASK which allows practical implementation of the RFPA because the supply voltage never goes to zero volts A continuous and continuously differentiable OPR-ASK phase signal which allows practical implementation of the phase modulator, phase shifter, or phase controller The smooth, continuously differentiable nature of the OPR-ASK envelope and phase signals allows easier time alignment between the envelope and phase components at the RFPA device, which in turn yields reduced distortion output The OPR-ASK modulation format facilitates a more practical realization of the RFID polar transmitter.

Figure 5:
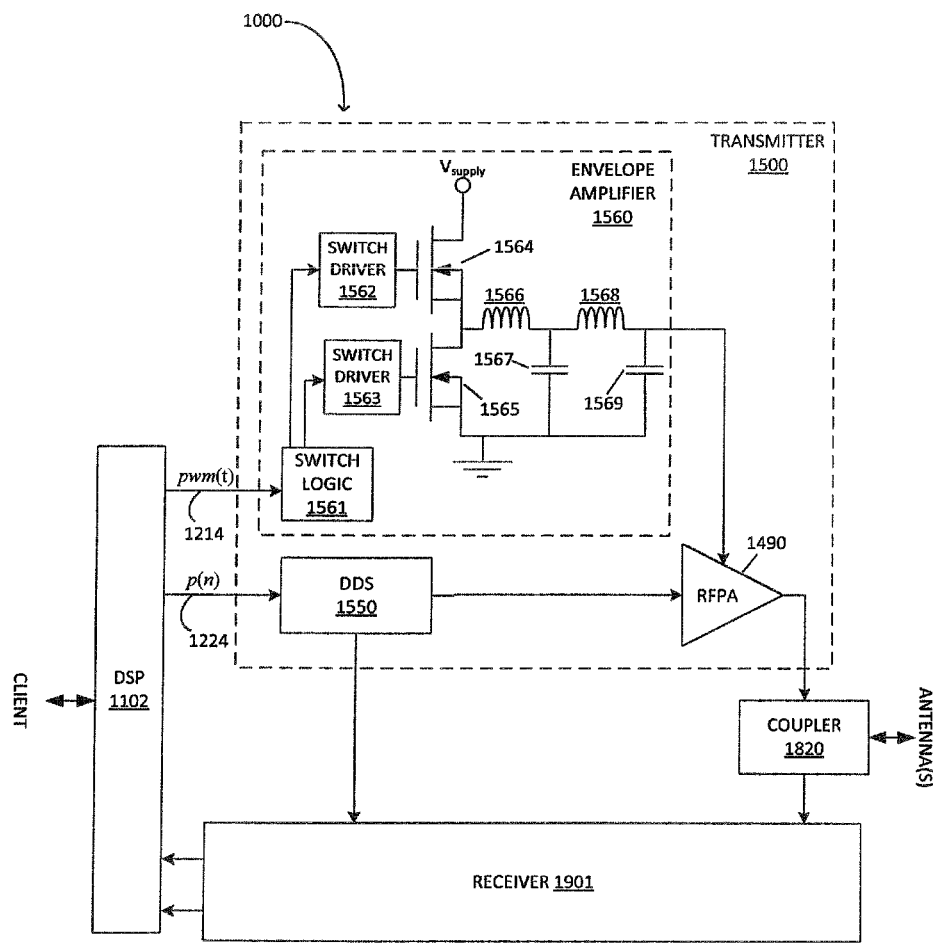
FIG. 5 is a block diagram of an RFID reader using a digitally controlled polar modulation transmitter.

FIG. 5 illustrates another example embodiment of this disclosure based on a polar modulation transmitter 1500. In this embodiment of the polar modulation transmitter 1500, the DSP 1102 produces a pulse width modulated (PWM) signal pwm(t) 1214 which represents the envelope of the RF signal. The PWM signal may still be referred to herein as the "envelope amplifier input signal." The PWM signal 1214 is the input to an envelope amplifier 1560 which converts the PWM signal 1214 to a high power envelope output signal which varies in proportion to the duty cycle of the PWM signal. The example embodiment of envelope amplifier 1560 is a buck converter, which is straightforward and has high efficiency. In order to improve efficiency the buck converter of envelope amplifier 1560 employs a second MOSFET 1565 in place of a catch diode. This technique is referred to as synchronous rectification. The PWM signal 1214 is input to a switch logic component 1561 which implements dead-time controller to avoid power supply shoot through in the synchronous rectifier, a technique which is understood by switch mode power supply engineers. Based on the input PWM signal, the switch logic controller controls the switch driver 1562 for the top switch 1564 and also controls the switch driver 1563 for the bottom switch 1565. The buck converter as illustrated in FIG. 5 has an output filter made up of inductors 1566 and 1568 and capacitors 1567 and 1569. This example is a 4$^{th}$ order output filter, but other orders are possible. The frequency response of the output filter could be Bessel, Butterworth, Legendre, or some other type of response. The response must attenuate the PWM switching harmonics and mixing images without excessive phase or amplitude distortion of the baseband envelope signal. If the DC power supply to the buck converter is constant and the buck converter operates in continuous conduction mode, then the envelope amplifier 1560 has linear output proportional to the PWM input duty cycle. This embodiment eliminates the DAC 1410 and filter 1412 associated with polar modulation transmitter 1400 in FIG. 3. Many common DSPs have PWM output capability. One example is the F28xxx family of DSPs produced by Texas Instruments with integrated high resolution PWM (HRPWM), which may achieve better than 12 bits resolution with a switching frequency of 1.25 MHz. Fully custom DSP solutions for RFID polar modulation may achieve even higher performance. The analysis and design of output filters for buck converters to suppress the switching frequency, harmonics, and sidebands is understood by those skilled in the art.

Continuing with FIG. 5, the DSP 1102 also produces a phase signal p(n) 1224 which is input to a direct digital synthesizer (DDS) 1550, which serves as a phase modulator. The DDS 1550 is capable of synthesizing RF signals in the appropriate UHF or microwave frequency band. The DDS 1550 can also digitally phase modulate the RFPA using the phase signal 1224 from the DSP 1102. This embodiment eliminates the DAC 1420, filter 1422, analog phase shifter 1450, and RF frequency synthesizer 1810 associated with the RFID reader design of FIG. 3. The output of DDS 1550 is a substantially constant envelope phase modulated signal which is input to the switch mode RFPA 1490, whose power supply is envelope modulated by envelope amplifier 1560. The output of DDS 1550 is also passed to the receiver 1901 for use in down-converting the receive RF signals to baseband for processing. The remaining operation of the coupler 1820 and receiver 1901 is the same as for the embodiment of FIG. 3.

Figure 6:
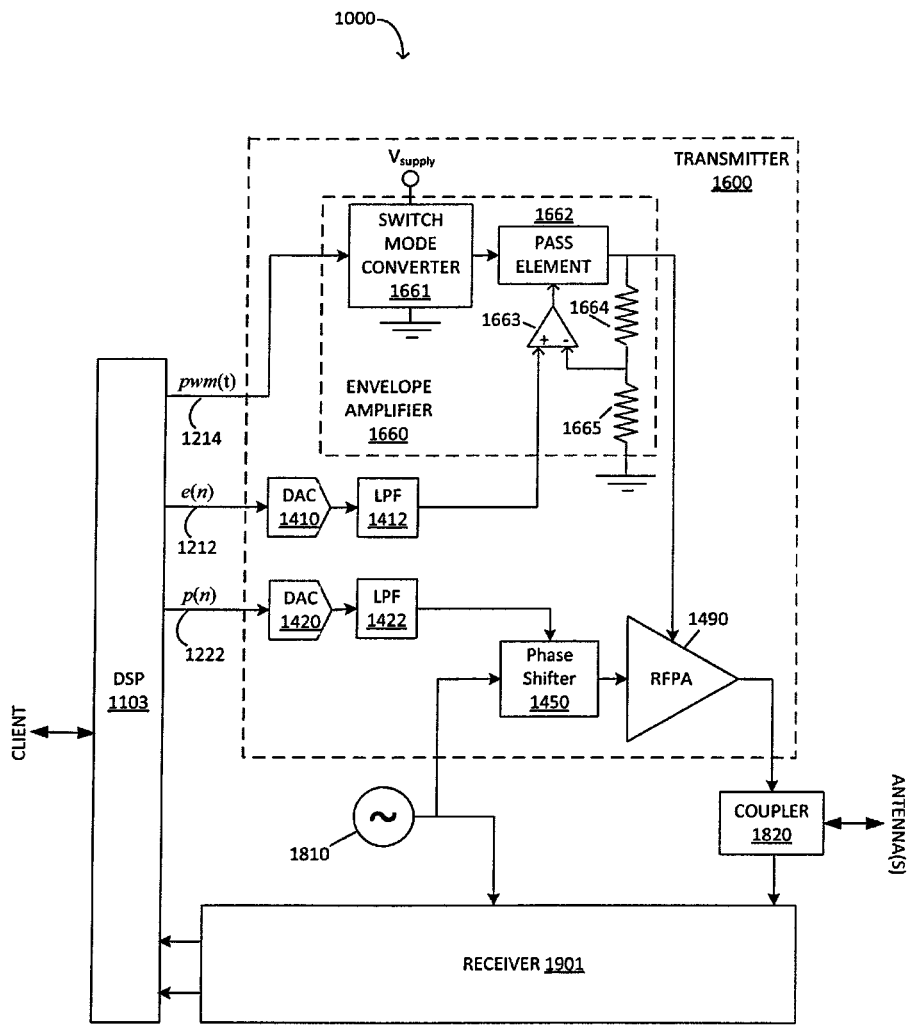
FIG. 6 is a block diagram of an RFID reader using a polar modulation transmitter which employs a PWM envelope amplifier with linear regulator assistance.
Figure 7:
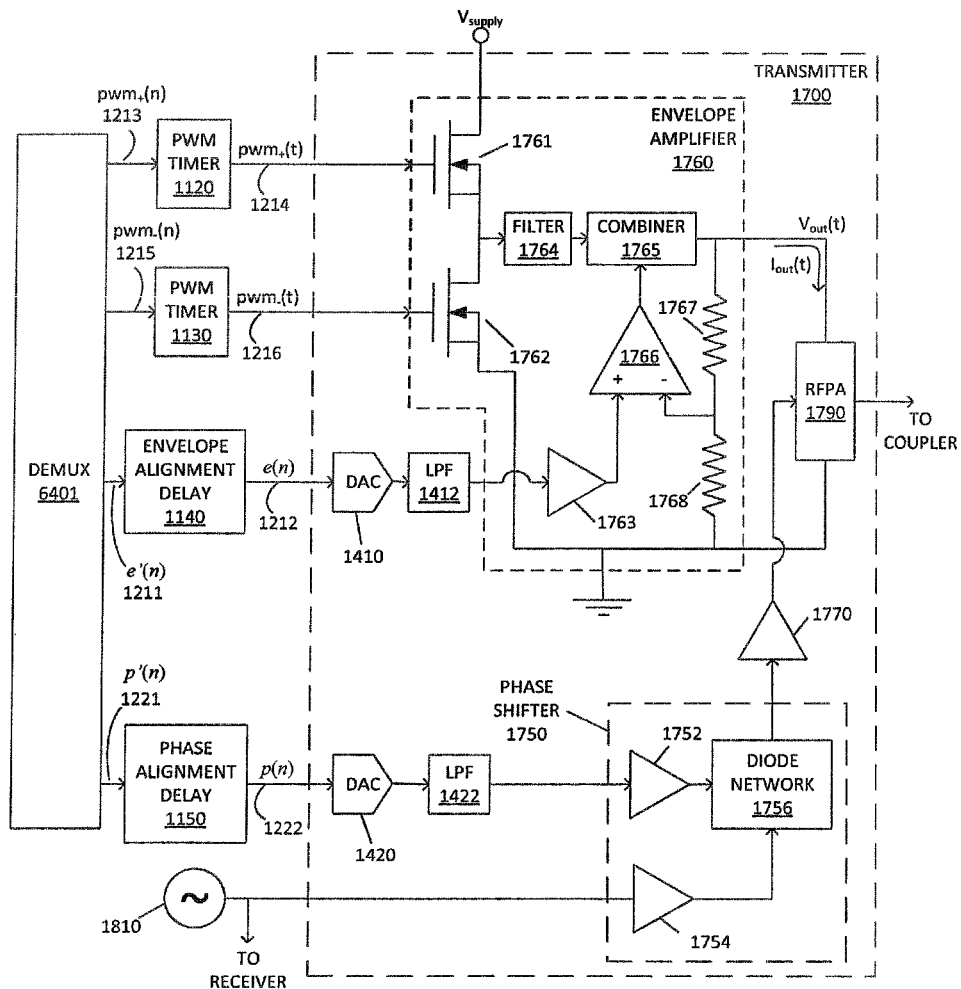
FIG. 7 is a detailed block diagram of an RFID polar transmitter with PWM and parallel linear regulator.

FIG. 6 illustrates another example embodiment of this disclosure based on a polar modulation transmitter 1600. In this embodiment of the polar modulation transmitter 1600, the DSP 1103 produces both a PWM signal pwm(t) 1214 and a signal e(n) 1212 which represents the envelope of the RF signal. The two of these signals together may be referred to herein at times as the "envelope amplifier input signal." DAC 1410 and LPF 1412 are used to create a continuous version of the envelope e(t), which is used as a reference signal in the linear assisted switch mode envelope amplifier 1660. The principal reason for using the linear assistance is for better tracking of the envelope amplifier input signal since a linear regulator will be able to provide a higher slew rate and compensate for tracking errors which may occur with a switch mode envelope amplifier alone. There are two basic choices of how to combine the switch mode supply with the linear regulator supply: series or parallel. In series operation the switch mode power supply provides the time varying operating voltage from which the linear regulator operates. The linear regulator provides the fast tracking output voltage, and the design goal of the series system is to minimize the voltage drop across the linear regulator. In a parallel combination of the switcher and linear amplifiers the linear regulator provides error correction to the switcher output. The envelope amplifier 1660 of FIG. 6 illustrates the architecture for a series linear regulator. FIG. 7 will provide a detailed example of parallel operation.

The envelope amplifier 1660 uses a switch mode power converter 1661 to produce a time varying output supply voltage. The converter 1661 could be a buck converter similar to in FIG. 5, or it could be a boost-buck converter, a multi-level converter, or any other switch mode supply known to those skilled in the art. The difference as applied to the series linear regulator combination is that the time varying output must be a slightly higher voltage than the actual desired envelope amplifier output. The linear pass element 1662 drops the output voltage to the desired output value. The pass element is controlled by error amplifier 1663 which accepts the LPF 1412 output as the reference and senses the actual output using feedback resistors 1664 and 1665. The linear regulator consisting of 1662, 1663, 1664, and 1665 is a low noise, high bandwidth system able to accurately track the reference signal. There is typically some minimum voltage drop across the pass element 1662, and the efficiency of this series assisted envelope amplifier is optimized when the switch mode converter 1661 keeps its output voltage near the desired output plus the minimum voltage drop. The pass element 1662 is the power stage of the linear regulator and may be one of a variety of technologies such as a NPN device, PNP device, NMOS device, or PMOS device. Note that the envelope reference signal 1212 must be delay matched with the PWM signal 1214 for optimum performance. This is illustrated in detail in FIG. 7. The remaining operation of the system in FIG. 6 is the same as in FIG. 3.

FIG. 7 provides a detailed example embodiment of polar transmitter 1700. This embodiment uses a linear assisted switch mode power supply where the linear regulator operates in parallel with the switch mode power supply. Note that the components 1120, 1130, 1140, 1150, and 6401 are all part of the DSP 1103. The demux 6401 is part of a table driven approach as in patent application U.S. 61/926,568 filed on Jan. 13, 2014, except in this embodiment the table waveforms contain four channels of data representing the waveforms pwm$_+$(n) 1213, pwm$_-$(n) 1215, e'(n) 1211, and p'(n) 1221. The demux 6401 separates the data channels of the stored waveform as they are read from memory and sends each channel to its designated output. The pwm$_+$(n) and pwm$_-$(n) outputs are sent to PWM timers 1120 and 1130, respectively. These timers produce continuous time PWM signals pwm$_+$(t) 1214 and pwm$_-$(t) 1216 which are used to control the main power switches 1761 and 1762 within the envelope amplifier 1760. Note that having two separate PWM outputs as in FIG. 7 eliminates the need for switch logic 1561 and in FIG. 5. The output of the switching devices passes through a filter 1764 which filters the switching waveforms before connecting to the combiner 1765 where the switching and linear outputs are combined.

The envelope amplifier input signal 1211 from the demux 6401 is passed to a delay 1140 which is optimized to minimize the delay mismatch between the PWM path to the combiner and the linear regulator path to the combiner. The output of delay 1140 goes to the DAC 1410 which converts the sampled data signal to a continuous time signal. The DAC 1410 will typically be followed by LPF 1412. The continuous time envelope amplifier input signal passes to the drive amplifier 1763 which provides level and impedance conversion for input to the linear regulator 1766. The linear regulator would typically be a current mode amplifier which compares the input from driver 1763 with the output voltage $v_{out}(t)$ using feedback resistors 1767 and 1768. The output of the linear regulator is combined with the switching converter at combiner 1765. The circuitry for the combiner 1765 make take on several forms, such as a push-pull stage with a pair of NPN and PNP bipolar transistors or it could be a pair of diodes connected anti-parallel, Schottky diodes being best due their low forward voltage drop. The purpose of the parallel linear regulator is to reduce the error in the output voltage. The switching converter efficiently provides the bulk of the output power but may not be able to provide a precisely tracking output voltage. The linear regulator is less efficient but only needs to drive small corrections in the output voltage to accurately track the input. Note again the fundamental difference between the series and parallel combination of the switching converter and linear regulator: in a series architecture the linear regulator operates continuously off the switcher output to track the reference signal, while in the parallel architecture the linear regulator operates off a fixed supply voltage but only sources or sinks current to make corrections to the switcher output.

The phase signal 1221 from the demux 6401 is passed to a delay 1150 which is optimized to minimize the delay mismatch between outputs of the phase shifter 1750 and the envelope amplifier 1760. The output of delay 1150 goes to the DAC 1420 which converts the sampled data signal to a continuous time signal. The DAC 1420 will typically be followed by LPF 1422. The continuous time phase control signal goes to driver amplifier 1752 which controls a diode network 1756 configured to provide continuous phase shifting of the RF signal under the control of driver 1752. The diode network is best designed using varactor diodes but could be done with pin diodes as well. Other phase shift circuits are possible and do not depart from the ideas disclosed herein. The design of a continuously variable phase shift network using RF diodes is known to those skilled in the art. The output of the frequency source 1810 passes to isolation amplifier 1754. The diode network 1756 typically will have a high insertion loss as well as an input impedance which varies based on the control signal from driver 1752. The isolation amplifier 1754 may be needed to isolate the frequency source 1810 from the time varying return loss of the diode network. The isolation amplifier can also provide signal gain to fulfill to total gain requirement of the transmitter lineup. The output of the diode network 1756 is passed to the amplifier 1770. The amplifier 1770 provides gain and matching to drive the main RF output switch mode device in the RFPA 1790. The RFPA 1790 converts the time varying envelope voltage from the envelope amplifier to an RF output signal by essentially being switched on and off with the phase modulated RF signal from driving amplifier 1770.

Beyond power efficiency, there are additional commercial advantages of using a switch mode RFPA such as a class-E amplifier. First, since the RFPA is operating in a fully saturated mode the broadband output noise floor of the transmitter may be reduced since the mechanism of gain and noise figure do not apply the same way as for linear mode devices. This reduces amplitude noise but does not affect phase noise, which mostly arises due to the synthesizer signal driving the RFPA. A second advantage is that the switch mode amplifier may be more readily integrated onto a system-on-a-chip than conventional class-AB designs. A third advantage is that switch mode designs such as class E may have reduced sensitivity to varying output load impedance, which can lead to more robust performance.

Figure 8:
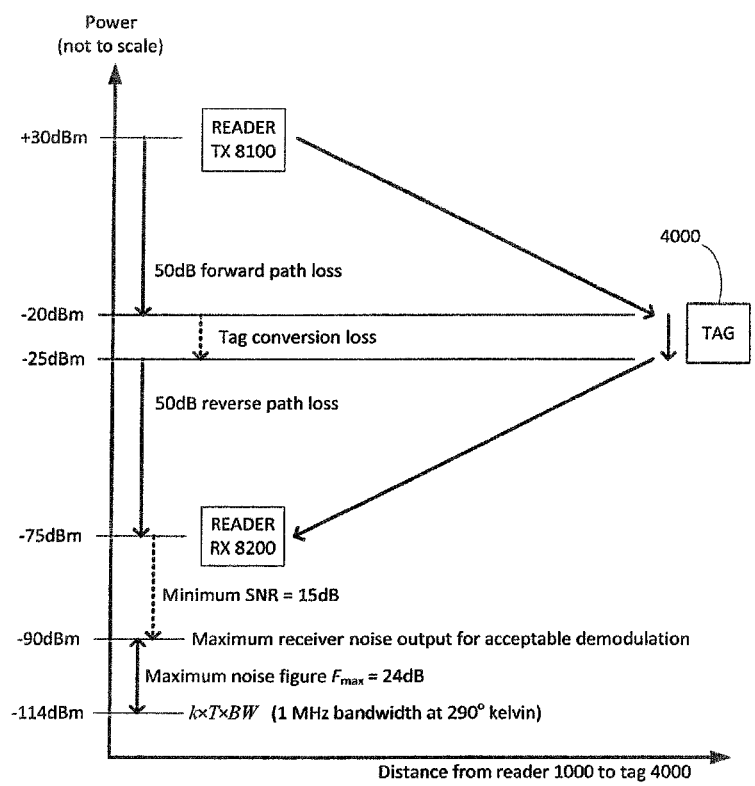
FIG. 8 is a diagram illustrating the communications link budget for a passive ultra-high frequency (UHF) backscatter RFID system.

FIG. 8 displays an example link budget for typical modern RFID systems were tag sensitivities are in the range of −10 dBm to −25 dBm. In passive RFID systems the tags 4000 rely on the forward radiating power from the RFID reader's transmitter 8100 to power the tags. For the purposes of the link budget analysis in FIG. 8 the reader transmitter 8100 may be any of transmitters 1300, 1400, 1500, 1600, 1700, or some combination of these. Under most regulatory environments the transmitter 8100 can conduct approximately one watt, or +30 dBm into the antenna. The forward path loss is given by the Friis equation, well known to those skilled in the art. The best tag sensitivity as of this writing is in the range of −18 dBm. This is the required power harvested at the tag 4000 for the tag to power up and activate. With future improvements in semiconductor technology tags may achieve −20 dBm or even better. Using −20 dBm as the minimum tag sensitivity, this suggests the range, and therefore forward path loss, is limited to 50 dB.

Not all of the power reaching the tag is modulated back to the reader. This reduction in backscatter modulation level is referred to as conversion loss in FIG. 8. A conversion loss of 5 dB is typical. Referring to FIG. 8, if the reader's transmit signal reaches the tag at a received power level of −20 dBm, then for a 5 dB backscatter conversion loss the tag signal sent back to the reader is −25 dBm. For monostatic antenna RFID systems the radio path is reciprocal, meaning the reverse path loss is the same as the forward path loss. Given the −20 dBm minimum activation power, the 5 dB conversion loss, and the 50 dB reverse path loss, it can be seen that the minimum receive signal strength at the reader will be −75 dBm.

For the common signal encoding used in RFID backscatter modulation a signal-to-noise ratio (SNR) of from 10 dB to 15 dB is required to achieve desired performance levels. FIG. 8 uses 15 dB as the SNR requirement, which yields a maximum noise floor from the receiver 8200 of −90 dBm. For the purposes of the link budget analysis in FIG. 8 the reader receiver 8200 may be any of receiver 1900, 1901, or some combination of these. In the absence of self-noise from the reader's own transmitter, it is well known to those skilled in the art that the radio receiver will have a minimum noise set by the thermal noise in the receiver together with the receiver's bandwidth BW and noise figure NF. The thermal noise density $N_0$, in watts per hertz, is $$N_0 = k \cdot T,$$

where k is Boltzmann's constant and T is the receiver temperature in Kelvin. This corresponds to approximately −174 dBm/Hz at 290 degrees Kelvin. The total thermal noise power into the receiver depends on the receiver bandwidth in Hertz. Using 1 MHz receiver bandwidth corresponds to 60 dB, i.e., this is $$BW = 10 \cdot log_{10}(10^6 \text{ Hertz}) = 60 \text{ dB},$$

then the total thermal noise power into the receiver is $k \cdot T \cdot BW = -114$ dBm. Note that there are many ways to measure the bandwidth of a system. Those skilled in the art are familiar with the concept of equivalent noise bandwidth, which is the definition used herein. The −114 dBm noise level would suggest a 24 dB margin compared to the −90 dBm maximum receiver noise output calculated above and shown in FIG. 8 to achieve the desired performance level. However, all receivers add a certain amount of noise to the theoretical minimum. This added noise above the theoretical minimum is referred to as noise figure NF, measured in dB.

Figure 9:
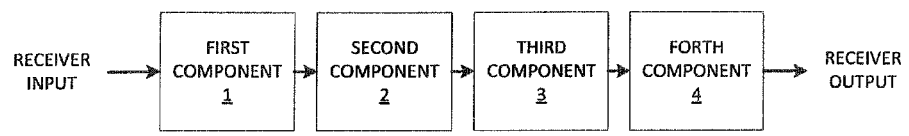
FIG. 9 is a block diagram of a generic receiver lineup with multiple processing components in series, each having an associated gain (loss) and noise figure.

Those skilled in the art know how to calculate the noise figure of a receiver from the line-up of components that make up the receiver. FIG. 9 shows a generic component lineup for an RFID receiver. The receiver may consist of circulators, isolators, directional couplers, low noise amplifiers, mixers, baseband amplifiers, limiting diodes, as well as other possible components. Each individual component is characterized by a gain (or loss) and noise figure. Components which attenuate the signal, i.e., components with a loss L have a noise figure equal to the loss NF=L in dB. Active components which have gain are characterized by their gain G and by their noise figure NF. The overall receiver noise figure can be calculated using the Friis formula for a cascade of components. The Friis formula uses the linear gain $g_n$ and noise factor $F_n$ of the $n^{th}$ component in the line-up, where $$F_n = 10^{NF_n/10},$$

is the relationship between the linear noise factor $E_n$ and the noise figure $NF_n$ in dB of the $n^{th}$ component, and $$g_n = 10^{G_n/10},$$

is the relationship between the linear gain $g_n$ and the gain $G_n$ in dB of the $n^{th}$ component.

For N components in the cascaded line up, where N=4 in FIG. 9, the total noise factor can be found with the Friis formula $$F = F_1 + \frac{F_2 - 1}{g_1} + \frac{F_3 - 1}{g_1 \cdot g_2} + \frac{F_4 - 1}{g_1 \cdot g_2 \cdot g_3} + \ldots + \frac{F_N - 1}{\prod_{n=1}^{N-1} g_n}$$

The total noise figure of the receiver is $NF = 10 \cdot log_{10}(F)$.

The conventional RFID reader receiver 1900 of FIG. 2 uses an LNA 1910 for a gain stage at RF in order to essentially set the noise figure ahead of the demodulation mixer 1921. Typical demodulation mixers have conversion loss from 9 dB to 13 dB, with the mixer noise figure equal to its loss, i.e. NF=L. High quality LNAs typically have 10 dB to 20 dB of gain with a noise figure of 2 to 4 dB. The baseband gains and filters in RFID receivers 1900 and 1901 each have associated gains (or losses) and noise figures.

The table below shows the gain-noise figure analysis for the conventional RFID receiver 1900 line up shown in FIG. 2.

|  | Component 1 | Component 2 | Component 3 | Component 4 | Component 5 |
|---|---|---|---|---|---|
| Gain "G" (dB) | −0.5 | −3.0 | 17.0 | −9.0 | 20.0 |
| Gain "g"(linear) | 0.9 | 0.5 | 50.1 | 0.1 | 100.0 |
| Noise Figure, "NF" (dB) | 0.5 | 3.0 | 2.5 | 9.0 | 15.0 |
| Noise Factor, "F" (linear) | 1.1 | 2.0 | 1.8 | 7.9 | 31.6 |
| Cumulative gain, g (linear) | 0.9 | 0.4 | 22.4 | 2.8 | 281.8 |
| Cumulative gain, G (dB) | −0.5 | −3.5 | 13.5 | 4.5 | 24.5 |
| Cumulative Noise Factor | 1.1 | 2.2 | 4.0 | 4.3 | 15.2 |
| Cumulative Noise Figure (dB) | 0.5 | 3.5 | 6.0 | 6.3 | 11.8 |
|  | TX-RX Ferrite Circulator | Active TX-RX Cancellation Summing | Receiver LNA | Receiver Mixer | Baseband Gain & Filter |

In this implementation First component 1 (referring to FIG. 9, the table above, and the Friis noise figure formula) is a ferrite circulator within coupler 1820 which has 0.5 dB of loss. Second component 2 is a transmitter cancellation RF signal combiner with a 3 dB loss. This second component 2 is also part of the coupler 1820. Third component 3 is a low noise amplifier 1910 with a gain of 17 dB and noise figure of 2.5 dB. These are typical numbers for high linearity LNAs in the UHF and microwave bands. Forth component 4 is quadrature down conversion mixer 1921 with a conversion loss of 9 dB. In this case the receiver lineup has a fifth component comprising the baseband amplifier and filtering with 15 dB noise figure and 20 dB of gain. Baseband amplifiers generally have much poorer noise figure than RF amplifiers. The gain and noise figure calculations shown in the table above result in a final gain and noise figure being G=24.5 dB and NF=11.8 dB. This is clearly better than the maximum noise figure of 24 dB shown in the example link budget of FIG. 8. It is often said that in a well-designed receive chain only the noise factor of the first amplifier should be significant. The lineup in FIG. 2 and the table above is an example of this design mindset. However, the design of FIG. 2 is expensive and may suffer from inadequate linearity due to the higher broadband gain at RF. The baseband includes filtering to reduce the bandwidth down to the a few kilohertz or up to a megahertz or so. This limits the interference and preferably the receiver gain is placed here in baseband where out-of-band interference is removed.

The table below shows the gain-noise figure analysis for the RFID reader design disclosed in FIG. 3.

|  | Component 1 | Component 2 | Component 3 | Component 4 |
|---|---|---|---|---|
| Gain "G" (dB) | −6.0 | 3.0 | 20.0 | 10.0 |
| Gain "g"(linear) | 0.3 | 2.0 | 100.0 | 10.0 |
| Noise Figure, "NF" (dB) | 6.0 | 12.0 | 15.0 | 15.0 |
| Noise Factor, "F" (linear) | 4.0 | 15.8 | 31.6 | 31.6 |
| Cumulative gain, g (linear) | 0.3 | 0.5 | 50.1 | 501.2 |
| Cumulative gain, G (dB) | −6.0 | −3.0 | 17.0 | 27.0 |
| Cumulative Noise Factor | 4.0 | 63.1 | 124.2 | 124.8 |
| Cumulative Noise Figure (dB) | 6.0 | 18.0 | 20.9 | 21.0 |
|  | TX-RX Coupler | Active Mixer | Baseband Gain & Filter | Baseband Gain & Filter (optional) |

In this implementation First component 1 is a directional coupler used as a four port device for transmitter cancellation via the reflective modulator mechanism analogous to the approach described by Kim et al in "A Passive Circulator for RFID Application with High Isolation using a Directional Coupler", in *Proceedings of the 36th European Microwave Conference,* 2006. The directional coupler is part of the coupler 1820 and has a receiver coupling loss of 6 dB in this example. The coupling factor is a design decision which affects the receiver noise figure and the post power amplifier loss in the transmission path. Higher coupling presents less loss in the receiver path, but more loss in the transmitter path. An example embodiment presented here opts for a 6 dB coupling factor.

First component 1 is passively connected to Second component 2, which is an active quadrature down conversion mixer 1522 with a conversion gain of 3 dB and a noise figure of 12 dB. Third component 3 comprises the baseband amplifier and filtering with 15 dB noise figure and 20 dB of gain. The gain and noise figure calculations shown in the table above result in a gain and noise figure being G=17.0 dB and NF=20.9 dB at the output of third component 3. If more gain is desired to reduce the effects of quantization noise at the ADCs 1980 and 1990, then an optional forth component 4 of additional gain and filtering can be added with 10 dB of gain and a noise figure of 15 dB. This puts the total gain and noise figure calculations being G=27.0 dB and NF=21.0 dB at the output of third component 4. This is better than the maximum noise figure of 24 dB shown in the example link budget of FIG. 8, but at reduced cost, reduced complexity, and improved linearity. Indeed, while the very low noise figure design of FIG. 2 may be needed for semi-passive backscatter tags which have much lower sensitivity than −20 dBm, the design of FIG. 2 is excessively complex and costly for passive backscatter RFID tags, as disclosed herein.

Note that elements of FIG. 3, FIG. 5, FIG. 6, and FIG. 7 can be interchanged without affect in the novel elements disclosed herein. The PWM driven envelope amplifier 1560 of FIG. 5 could be used with the analog phase modulation design of FIG. 3, and conversely the DDS 1550 of FIG. 5 could be used with the analog input envelope amplifier 1460 of FIG. 3. Envelope amplifiers designed as linear assisted switch mode amplifiers can be used with any type of phase modulator. All of these transmitters and even transmitter 1300 can be used with a passively coupled receive RF path and active mixer 1922 in order to reduce receiver cost and improve linearity. Other variants are also possible without departing from the ideas disclosed herein and will be evident to those skilled in the art.

Figure 10:
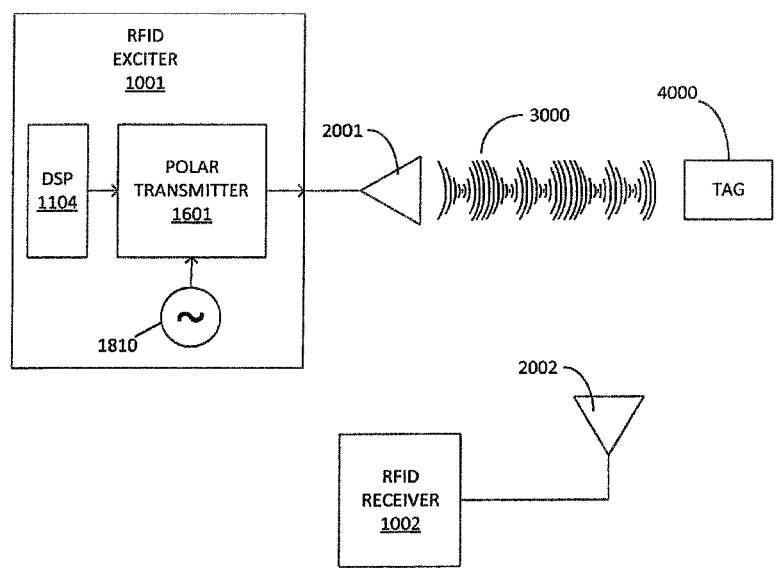
FIG. 10 is a high level block diagram of an RFID system using a polar transmitter wherein the transmitter and receiver functions may be physically separated.

FIG. 10 shows a block diagram of an alternative embodiment for an RFID system using a polar transmitter wherein the transmit and receive functions may be physically separated. RFID transmitter 1001 contains a DSP 1104 which performs baseband signal processing and radio control functions for the transmitter. DSP 1104 sends envelope and phase signals to polar transmitter 1601, which may be any combination of polar transmitter elements previously discussed. The high power polar transmitter output is send to one or more transmit antennas 2001 connected to transmitter 1001. The transmitter 1001 may contain its own frequency source 1811 as shown in FIG. 10, or it could be feed a frequency source from some external master clock source which is not shown. The RFID receiver 1002 contains a receiver 1902 which is connected to one or more receive antennas 2002. Receiver 1902 may be substantially different from previously discussed receivers since this is a bistatic antenna configuration and the noise, transmitter self-interference, and sensitivity requirements may be substantially different than for the monostatic configurations previously discussed. Recall that a monostatic antenna configuration is when the same antenna is used for simultaneously transmitting and receiving. The RFID receiver 1002 contains a DSP 1105 which demodulates tags. The RFID receiver may have its own frequency source 1812, may be feed from the RFID transmitter's frequency source 1811, or could be feed from some other master frequency source. Both RFID transmitter 1001 and RFID receiver 1002 communicate to the client hardware or software. There will also commonly be timing coordination between the RFID transmitter 1001 and receiver 1002 to control the protocol timing, among other things.

The example devices and methods in this disclosure can achieve FCC and ETSI regulatory compliance with low cost, low power, and high performance. In some embodiments, a general-purpose processor such as a DSP, microcontroller or microprocessor is used and non-transitory firmware, software, or microcode can be stored in a tangible storage medium that is associated with the device. Any such device may be referred to herein as a "processor" or a "microprocessor." Such a medium may be a memory integrated into the processor, or may be a memory chip that is addressed by the controller to perform control functions. Such firmware, software or microcode is executable by the processor and when executed, causes the processor to perform its control functions. Such firmware or software could also be stored in or on a tangible medium such as an optical disk or traditional removable or fixed magnetic medium such as a disk drive used to load the firmware or software into an RFID system.

It should be noted that any data and information necessary to support the execution of instructions for any embodiment of the disclosure can be placed in a removable storage medium as well. These could be stored on a disk as well, especially for development purposes or for maintenance and update purposes. Such a storage medium may be accessed either directly or over a network, including the Internet.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A radio frequency identification (RFID) system comprising:
   a switch mode power amplifier;
   an envelope amplifier connected to the switch mode power amplifier to provide an envelope signal to the switch mode power amplifier;
   a phase modulator connected to the switch mode power amplifier to phase modulate the switch mode power amplifier using a phase signal so that the envelope amplifier and phase modulator provide a transmitter output signal; and
   a receiver to receive responses from RFID tags.

2. The RFID system of claim 1 further comprising a coupler connected to the polar transmitter and the receiver to pass the transmitter output signal to one or more antennas and to pass the responses to the receiver.

3. The RFID system of claim 1 wherein the polar transmitter and the receiver are separated.

4. The RFID system of claim 1 wherein the envelope amplifier further comprises a buck converter.

5. The RFID system of claim 1 wherein the phase modulator further comprises a phase shifter connected to a local oscillator.

6. The RFID system of claim 1 wherein the phase modulator further comprises a direct digital synthesizer.

7. The RFID system of claim 4 wherein an envelope amplifier input signal comprises a pulse width modulated (PWM) signal.

8. The RFID system of claim 1 wherein the envelope amplifier further comprises:
   a switch mode power supply; and
   a linear regulator connected to the switch mode power supply.

9. The RFID system of claim 8 wherein the switch mode power supply and the linear regulator are connected in parallel.

10. The RFID system of claim 8 wherein the switch mode power supply and the linear regulator are connected in series.

11. The RFID system according to claim 8 wherein the switch mode power supply further comprises a buck converter.

12. The RFID system according to claim 5 wherein the receiver further comprises a passively connected active mixer.

13. The RFID system according to claim 12 wherein the transmitter output signal is provided using offset phase reversal amplitude shift keying (OPR-ASK).

14. A method of operating a radio frequency identification (RFID) system, the method comprising:
    producing, using a processor, a sampled data envelope amplifier input signal and a sampled data phase signal;
    providing the sampled data envelope amplifier input signal to an envelope amplifier;
    supplying an envelope signal from the envelope amplifier to a switch mode power amplifier;
    phase modulating the switch mode power amplifier using the phase signal to produce a transmitter output signal from the envelope signal.

15. The method of claim 14 further comprising supplying the transmitter output signal to an antenna.

16. The method of claim 15 wherein the supplying of the transmitter output signal further comprises supplying the transmitter output signal to the antenna through a coupler.

17. The method of claim 14 wherein the phase modulating of the switch mode power amplifier further comprises shifting the phase using the phase signal.

18. The method of claim 14 wherein the phase modulating of the switch mode power amplifier further comprises digitally phase modulating the switch mode power amplifier.

19. The method according to claim 14 further comprising receiving a response from an RFID tag.

20. The method of claim 19 wherein the receiving of the response further comprises passively providing a response signal to an active mixer.

21. The method according to claim 19 wherein the transmitter output signal is produced using offset phase reversal amplitude shift keying (OPR-ASK).

22. Apparatus for radio frequency identification (RFID) comprising:
    means for producing a sampled data envelope amplifier input signal and a sampled data phase signal;
    means for amplifying the sampled data envelope amplifier input signal to produce an envelope signal;
    means for providing a transmitter output signal based at least in part on an envelope signal; and
    means for phase modulating the transmitter output signal based at least in part on the phase signal.

23. The apparatus of claim 22 further comprising means for supplying the transmitter output signal to an antenna.

24. The apparatus of claim 23 further comprising means for receiving a response from an RFID tag.

25. The apparatus of claim 24 wherein the means for receiving further comprises means for passively transferring a response signal within the means for receiving.

* * * * *